J. J. Cadenhead.
Plow.
Nº 14,346. Patented Mar. 4, 1856.
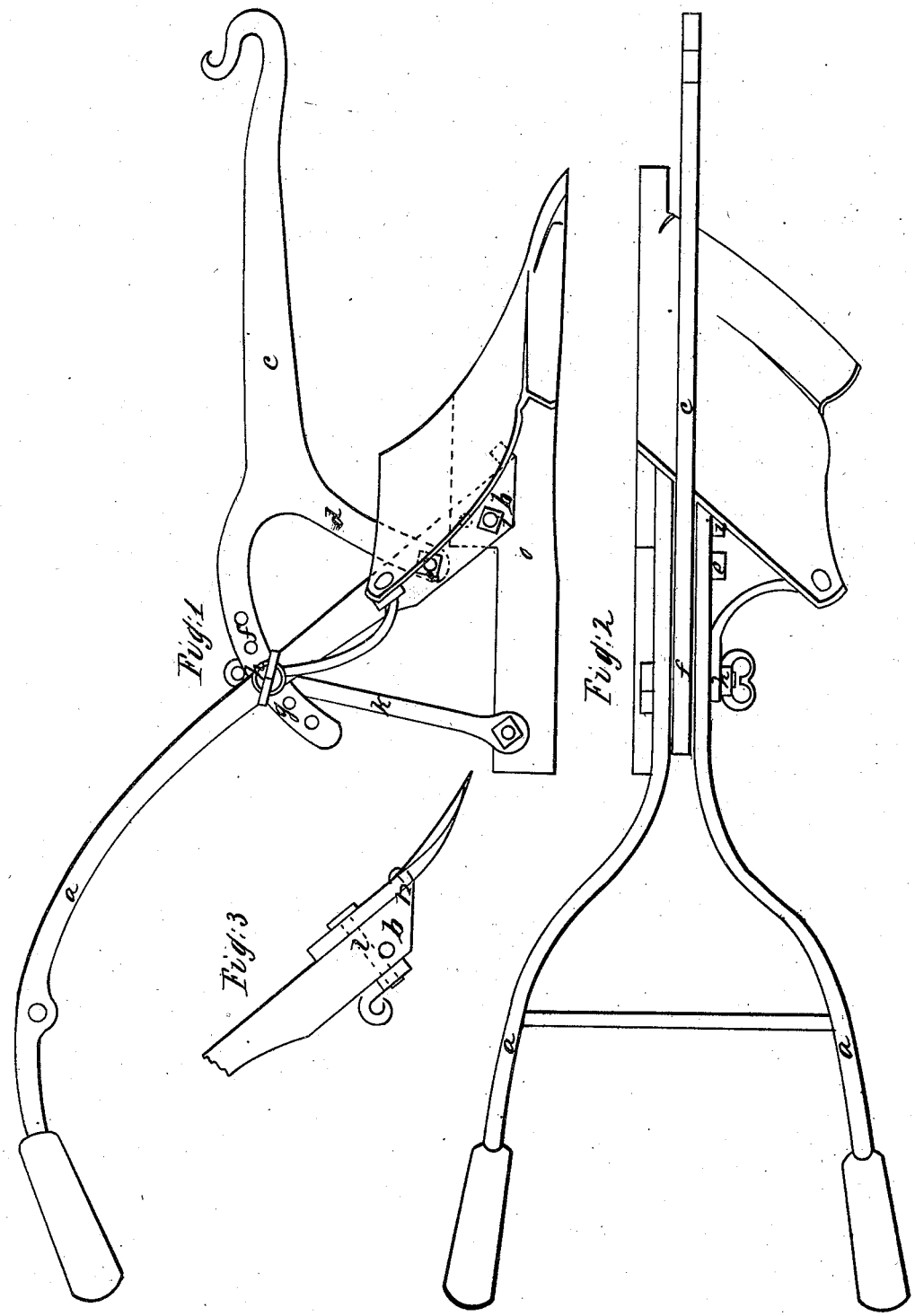

UNITED STATES PATENT OFFICE.

JAS. J. CADENHEAD, OF MACON COUNTY, ALABAMA.

IMPROVEMENT IN PLOWS.

Specification forming part of Letters Patent No. 14,346, dated March 4, 1856.

*To all whom it may concern:*

Be it known that I, JAMES J. CADENHEAD, of the county of Macon, in the State of Alabama, have invented certain new and useful Improvements in Plows; and I hereby declare that the following is a full, clear, and exact description thereof, reference being had to the accompanying drawings, making part of this specification, in which—

Figure 1 represents an elevation, Fig. 2 a plan view, and Fig. 3 an elevation, of a skuter and part of the foot of the plow.

The letters of reference indicate the same parts in the different figures.

I construct my improved plow generally of iron. The handles $a$ unite at their lower extremities and form the foot $b$. The beam $c$ is divided at its rear end, one portion, $d$, bending downward until it meets the handles, to which it is pivoted by the bolt $e$, and the upper portion bent into an arc of a circle, $f$, of which the bolt $e$ is the center. This arc is perforated with holes $g$. The bolt $h$ passes through holes in the handles and any one of the holes $g$, according to the pitch desired, thus dispensing with a clevis altogether, the team being attached to a hook formed on the end of the beam.

In Fig. 1 a common bar-plow is secured to the foot $b$ by the bolt $i$ and the brace $k$, through a hole in which the bolt $h$ passes. The plow and brace are both provided with extra holes, by which their positions relative to the beam and handles can be changed, so as to adjust the beam to the height of the team, thus allowing the use of either horses, mules, or oxen, as may be most convenient.

The bar plow can be readily removed, and any other form of plow can be substituted, of which an instance is shown in Fig. 3, where a skuter or shovel-plow is attached by means of a bolt, $l$, and prevented from changing its position laterally by the pin $m$ taking in a hole therein.

Having thus fully described my improvement, what I claim as my invention, and desire to secure by Letters Patent, is—

The adjustability of the brace $k$, in combination with that of the bar $o$ and that of the beam $c$, for the purpose of regulating, as herein described, the pitch of the beam, and the height of the beam and handles together or separately.

In testimony whereof I have signed my name to this specification before two subscribing witnesses.

JAMES J. CADENHEAD.

Witnesses:
 CHAS. EVERETT,
 A. POLLAK.